United States Patent [19]

Carter

[11] Patent Number: 4,883,690
[45] Date of Patent: Nov. 28, 1989

[54] METHOD AND APPARATUS FOR COATING ELONGATE MEMBERS

[75] Inventor: Neil A. Carter, Granville, Ohio

[73] Assignee: Owens-Corning Fiberglas Corporation, Toledo, Ohio

[21] Appl. No.: 202,332

[22] Filed: Jun. 6, 1988

[51] Int. Cl.$^4$ .................... B29C 41/20; B05C 1/02; B05C 5/02

[52] U.S. Cl. ..................... 427/430.1; 118/692; 118/405; 118/410; 118/419; 264/171; 264/259; 425/113; 425/122; 425/190; 425/376.1; 425/461

[58] Field of Search ................ 264/171, 259; 425/113, 425/122, 961, 462, 376.1, 190; 118/404, 405, 410, 411, 414, 428; 427/430.1

[56] References Cited

U.S. PATENT DOCUMENTS

| | | | |
|---|---|---|---|
| 2,175,099 | 10/1939 | Abbott | 118/405 |
| 2,447,420 | 8/1948 | Moore | 138/145 |
| 2,859,476 | 8/1955 | Lainson | 425/462 |
| 3,429,734 | 2/1969 | Coad | 118/405 |
| 3,502,752 | 3/1970 | Brown | 118/405 |
| 3,882,819 | 5/1975 | Skeeters | 118/405 |
| 4,081,232 | 3/1978 | Pemberton et al. | 425/463 |
| 4,303,734 | 12/1981 | Sullivan | 428/368 |
| 4,400,338 | 8/1983 | Rundo | 264/171 |
| 4,510,884 | 4/1985 | Rosebrooks | 118/405 |
| 4,521,363 | 6/1985 | Vogel | 425/462 |
| 4,553,364 | 11/1985 | Legg et al. | 52/309.13 |
| 4,640,065 | 2/1987 | Harris et al. | 52/309.1 |
| 6,681,722 | 7/1987 | Carter et al. | 264/258 |

FOREIGN PATENT DOCUMENTS 367694 2/1932 United Kingdom ............. 118/404

*Primary Examiner*—Willard Hoag
*Attorney, Agent, or Firm*—Patrick P. Pacella; Ted C. Gillespie

[57] ABSTRACT

Method and apparatus to apply a coating or coatings of a predetermined thickness over designated sections of a continously advanced elongate member by means of cooperating guide die and coating die segments. The die includes two abutting members through which, the article to be coated, passes the first member defining a guide passage and the second being in the form of a collar defining a coating groove for distributing the coating material and limiting its thickness. Since the two parts are separable cleaning is facilitated.

15 Claims, 1 Drawing Sheet

METHOD AND APPARATUS FOR COATING ELONGATE MEMBERS

TECHNICAL FIELD

The invention disclosed herein relates to apparatus for applying a coating or coatings of paint of a predetermined thickness or thicknesses over designated surface sections of a continuously advancing elongate member having a constant cross-sectional shape.

BACKGROUND

Very often it is desirable to apply a coating, such as paint, of a predetermined constant thickness to all or part of an elongate member, such as a lineal used to fabricate windows and the like. In the case when the elongate member is extruded, for example see U.S. Pat. No. 4,681,722 issued to Carter et al., it may be very desirable to apply such a coating contemporaneously or in-line with the extrusion process.

Typical systems for applying paint to an advancing elongate member or lineal include spray guns and rollers. Such system do not permit the paint to be applied with sufficient precision without masking off the portion to be painted.

The present invention provides a system capable of applying a coating of a predetermined, constant thickness over the entire surface of the elongate member, or precisely over a designated section or sections thereof, without masking, as the elongate member advances, either in-line with the extrusion process or separate therefrom. Further, the present invention permits the paint to be applied with greater efficiency, since there is no over spray, which can also cause environmental problems. In addition, the paint can have a higher solids content than permitted by such systems.

DISCLOSURE OF THE INVENTION

This invention pertains to method and apparatus for applying a coating to an advancing elongate member having a constant cross-sectional shape comprising: a housing having a guideway closely conforming to the cross-sectional size and shape of the uncoated member over at least a portion thereof; and a collar in abutting engagement with the housing, the collar having a passageway conforming to the cross-sectional shape of the member and in communication with the guideway of the housing, a surface of the passageway of the collar being spaced from the surface of the elongate member to be coated by a distance equal to the desired coating thickness over the member at that section, said passageway surface having a transverse recess adapted to be supplied with the coating material, the recess and passageway cooperating to continuously apply the coating to the desired surface of elongate member at the desired thickness as the elongate member continuously advances through the apparatus.

BEST MODE OF CARRYING OUT THE INVENTION

Figure 1:
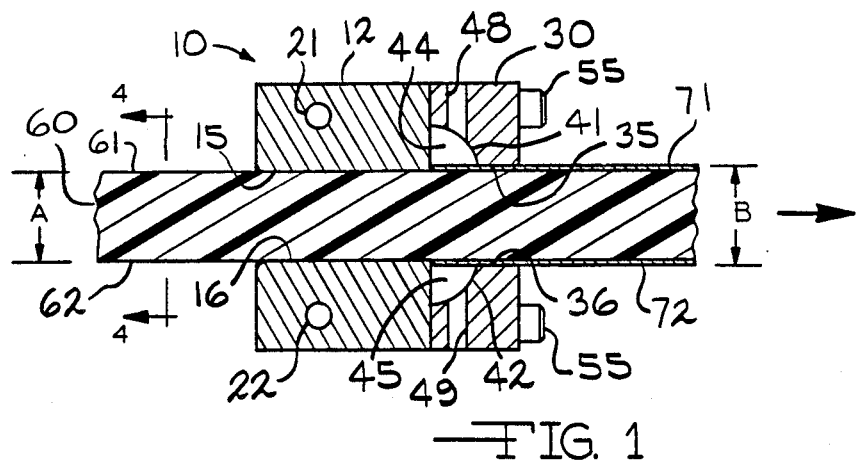
FIG. 1 is a cross-sectional elevational view of the present invention applying a coating to an advancing elongate member.

As shown in FIG. 1, coating application apparatus 10 is comprised of housing 12 and collar 30. The guideway 14 of housing 12 and the passageway 34 of collar 30 cooperate to apply a continuous coating of a predetermined thickness over a designated section or sections of the surface of elongate member 60 as the member 60 continuously advances through apparatus 10.

Figure 2:
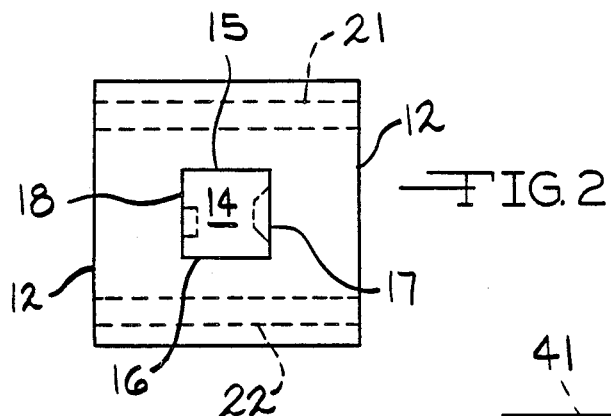
FIG. 2 is an end view, left, of the apparatus shown in FIG. 1, the elongate member is shown in phantom.
Figure 3:
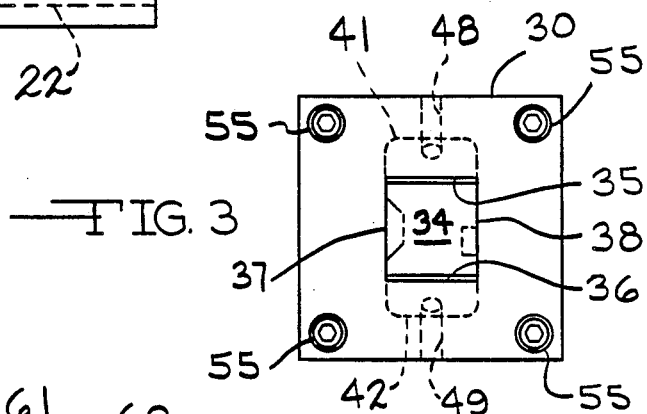
FIG. 3 is end view, right, of the apparatus shown in FIG. 1, the elongate member is shown in phantom.
Figure 4:
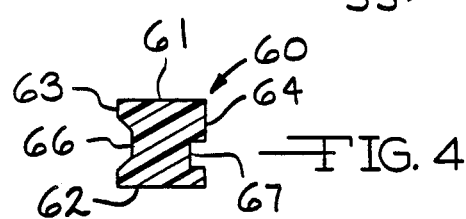
FIG. 4 is a cross-sectional view of the elongate member taken along VIEW 4—4.

Housing 12, as shown in FIGS. 1 and 2, has a guideway 14 extending therethrough which is defined by first guide surface 15, second guide surface 16, third guide surface 17 and fourth guide surface 18. First and second guide surfaces 15 and 16 of guideway 14 closely conform to the cross-sectional size and shape of the uncoated member 60 over first surface 61 and second surface 62. As a matter of convenience, third and fourth guide surfaces 17 and 18 closely conform to only a portion of third surface 63 and fourth surface 64 of member 60 which are not painted. That is, third guide surface 17 is not contoured to conform or extend into channel 66 of third surface 63. Nor is fourth guide surface 18 contoured to conform to channel 67 of fourth surface 64. However it is to be understood that either guide surface 17 or guide surface 18 or both could be configured to completely, intimately conform to the associated surfaces 63 and 64 of the elongate member 60, if desired.

For the most part, housing 12 serves to properly locate the member 60 relative to apparatus 10. As such, the clearances between the respective surfaces of member 60 and the surfaces of the guideway 14 should be the minimum required to permit the passage of member 60 therethrough at the desired line speed. The clearance between the surface of the member to be coated and the associated guideway surface is of particular significance since housing 12, in part, define the reservoir or reservoirs adapted to contain the body of liquid coating material therein. The guideway is desireably machined contemporaneously with the forming die of the extrusion system to yield a tolerance of about ±0.0001 inches from the forming die dimensions.

Cooling ports 21 and 22, which are optional, are adapted to receive a flow of cooling fluid therethrough to maintain apparatus 10 at a suitable temperature, especially if the process is in-line and the lineal is at an elevated temperature.

Collar 30, which is held in abutting engagement with housing 12 by means of fasteners 55, has a passageway 34 extending therethrough. Passageway 34 is coaxial with guideway 14 and is in communication therewith. Passageway 34 is defined by first surface 35, second surface 36, third surface 37 and fourth surface 38. First surface 35 includes a recess 41 and second surface 36 includes a recess 42 to, in part, define reservoirs 44 and 45, respectively.

Surfaces 18 and 38 are coplanar as well as surfaces 17 and 37. However, according to the principles of the present invention surface 35 is relieved or spaced from the plane of guide surface 15 by a distance substantially equal to the thickness of the coating to applied over surface 61 of member 60. Similarly, surface 36 is relieved from the plane of guide surface 16 by a distance substantially equal to the thickness of the coating to be applied over surface 62 of member 60. Desireably such dimensions are held to a tolerance of ±0.005 inches. Thus dimension "B", that is the distance between coated surfaces 71 and 72 of member 60, is equal to dimension "A", the distance between uncoated surfaces 61 and 62, plus the thickness of the coatings 71 and 72. With the present invention, such coatings may be applied at different thicknesses if desired. As described herein, surfaces 63 and 64 of member 60 receive no coating material as member 60 passes or moves through housing 12 and collar 30.

As shown, member 60 is generally rectangular in shape and only opposed surfaces 61 and 62 are coated. Of course it is to be understood that the principles of the present invention can be adapted to coat members of other cross-sectional shapes or configurations.

Reservoirs 44 and 45, which are primarily defined by recesses 41 and 42, respectively, are supplied through supply ports 48 and 49, respectively. Supply ports 48 and 49 are preferably connected to any suitable constant pressure feed pump (not shown) capable of delivering the liquid coating material at the desired pressure and volume. Of course, the supply ports may be independently fed, is desired.

Thus, the present invention provides a simple system for applying a coating or coatings, such as liquid paint, at a predetermined thickness or thicknesses over a predetermined section or sections of a constant cross-section elongated member substantially without overflow or feedback. That is, substantially no excess paint is supplied to the paint applying recesses 41 and 42. Substantially all of the paint is applied to the designated sections of the member 60.

It is apparent that within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the construction materials fabrication industry and, in particular, lineals for the fabrication windows and doors.

I claim:

1. Apparatus for applying a coating to an advancing elongate member having a constant cross-sectional shape comprising:
   a housing having a guideway closely conforming to the cross-sectional size and shape of the uncoated elongate member over at least a portion thereof, the guideway being comprised of a plurality of guide surfaces; and
   a collar in abutting engagement with the housing, the collar having a passageway in communication with the guideway of the housing, and the collar passageway being comprised of a plurality of passageway surfaces corresponding to the guide surfaces of the housing guideway;
   a first passageway surface being coplanar with the corresponding guide surface of the housing so that substantially none of the coating is applied to the portion of the elongate member in contact with said first passageway surface;
   a second passageway surface being offset from the plane of the corresponding guide surface of the housing so that the coating is applied to the portion of the elongate member in contact with said second passageway surface, where the amount of offset of said second passageway surface is substantially equal to the desired coating thickness to be applied to the portion of the elongate member in contact with said second passageway surface; and
   a transverse recess in said second passageway surface, said transverse recess being adapted to be supplied with the coating material, said transverse recess and second passageway surface being adapted to cooperate to continuously apply the coating to the desired portion of elongate member at the desired thickness as the elongate member continuously advances through the apparatus.

2. The apparatus of claim 1 wherein the transverse recess of the passageway abuts the guideway.

3. The apparatus of claim 8 wherein the collar is generally rectangular in cross-sectional shape and only one pair of opposed surfaces of the rectangular collar is to be coated.

4. The method of applying liquid paint to a predetermined section of an advancing elongate member having a constant cross-sectional shape comprising:
   (a) passing the member through a housing having a guideway closely conforming to the cross-sectional size and shape of the unpainted member over at least a portion thereof, the guideway being comprised of a plurality of guide surfaces;
   (b) then passing the member through a collar having:
      (1) a passageway in communication with the guideway of the housing, the passageway conforming, at least in part, to the cross-sectional shape of the member, the passageway being comprised of a plurality of passageway surfaces corresponding to the guide surfaces of the housing guideway, the passageway further characterized in that:
         (i) a first passageway surface is coplanar with the corresponding guide surface of the housing so that substantially none of the coating is applied to the portion of the elongate member in contact with said first passageway surface; and
         (ii) a second passageway surface is offset from the plane of the corresponding guide surface of the housing so that the coating is applied to the portion of the elongate member in contact with said second passageway surface, where the amount of offset of said second passageway surface is substantially equal to the desired coating thickness to be applied to the portion of the elongate member in contact with said second passageway surface;
      (2) a transverse recess adapted to be supplied with the coating material, said transverse recess and second passageway surface being adapted to cooperate to continuously apply the coating to the desired portion of elongate member at the desired thickness as the elongate member continuously advances through the apparatus.
   (c) supplying liquid paint to the recess to continuously apply the paint to only the desired surface of elongate member.

5. The method of claim 4 further comprising controlling the pressure of the liquid paint such that substantially no excess paint is supplied to the recess.

6. The method of claim 4 in which the elongate member and the passageway are generally rectangular in cross-sectional shape.

7. The method of claim 6 in which only one pair of opposed surfaces of the rectangular elongate member is coated.

8. The method of applying liquid paint to a an advancing window lineal having a constant cross-sectional shape comprising:
 (a) passing the window lineal through a housing having a guideway closely conforming to the cross-sectional size and shape of the unpainted window lineal over at least a portion thereof, the guideway being comprised of a plurality of guide surfaces;
 (b) then passing the window lineal through a collar having:
  (1) a passageway in communication with the guideway of the housing, the passageway conforming, at least in part, to the cross-sectional shape of the window lineal, the passageway being comprised of a plurality of passageway surfaces corresponding to the guide surfaces of the housing guideway, the passageway further having at least one of said passageway surfaces is offset from the plane of the corresponding guide surfaces of the housing so that the coating is applied to the window lineal in contact with said one passageway surface, where the amount of offset of said passageway surface is substantially equal to the desired coating thickness to be applied to the portion of the window lineal in contact with said passageway surface;
  (2) a transverse recess adapted to be supplied with the coating material, said transverse recess and passageway surface being adapted to cooperate to continuously apply the coating to the desired portion of window lineal at the desired thickness as the window lineal continuously advances through the apparatus; and
 (c) supplying liquid paint to the recess to continuously apply the paint to only the desired surface of window lineal.

9. The method of claim 8 further comprising controlling the pressure of the liquid paint such that substantially no excess paint is supplied to the recess.

10. The method of claim 8 in which the window lineal and the passageway are generally rectangular in cross-sectional shape.

11. The method of claim 10 in which only one pair of opposed surfaces of the rectangular window lineals is to be coated.

12. The method of applying liquid paint to a predetermined section of an advancing window lineal having a constant cross-sectional shape comprising:
 (a) passing the window lineal through a housing having a guideway closely conforming to the cross-sectional size and shape of the unpainted window lineal over at least a portion thereof, the guideway being comprised of a plurality of guide surfaces;
 (b) then passing the window lineal through a collar having:
  (1) a passageway in communication with the guideway of the housing, the passageway conforming, at least in part, to the cross-sectional shape of the window lineal, the passageway being comprised of a plurality of passageway surfaces corresponding to the guide surfaces of the housing guideway, the passageway having:
   (i) a first passageway surface is coplanar with the corresponding guide surface of the housing so that substantially none of the coating is applied to the portion of the window lineal in contact with said first passageway surface; and
   (ii) a second passageway surface is offset from the plane of the corresponding guide surface of the housing so that the coating is applied to the portion of the window lineal in contact with said second passageway surface, where the amount of offset of said second passageway surface is substantially equal to the desired coating thickness to be applied to the portion of the window lineal in contact with said second passageway surface;
  (2) a transverse recess adapted to be supplied with the coating material, said transverse recess and second passageway surface being adapted to cooperate to continuously apply the coating to the desired portion of window lineal at the desired thickness as the window lineal continuously advances through the apparatus.
 (c) supplying liquid paint to the recess to continuously apply the paint to only the desired surface of the window lineal.

13. The method of claim 12 further comprising controlling the pressure of the liquid paint such that substantially no excess paint is supplied to the recess.

14. The method of claim 12 in which the window lineal and the passageway are generally rectangular in cross-sectional shape.

15. The method of claim 13 in which only one pair of opposed surfaces of the rectangular window lineal is to be coated.

* * * * *